(12) United States Patent
Boo

(10) Patent No.: US 10,415,613 B2
(45) Date of Patent: Sep. 17, 2019

(54) SET OF PANEL-SHAPED ELEMENTS FOR A COMPOSED ELEMENT

(71) Applicant: Välinge Innovation AB, Viken (SE)

(72) Inventor: Christian Boo, Kagerod (SE)

(73) Assignee: VALINGE INNOVATION AB, Viken (SE)

( * ) Notice: Subject to any disclaimer, the term of this patent is extended or adjusted under 35 U.S.C. 154(b) by 193 days.

(21) Appl. No.: 15/428,504

(22) Filed: Feb. 9, 2017

(65) Prior Publication Data

US 2017/0227031 A1 Aug. 10, 2017

(30) Foreign Application Priority Data

Feb. 9, 2016 (SE) .................................... 16501587

(51) Int. Cl.
*F16B 5/00* (2006.01)
*A47B 88/90* (2017.01)
(Continued)

(52) U.S. Cl.
CPC ................ *F16B 5/008* (2013.01); *A47B 3/06* (2013.01); *A47B 47/0075* (2013.01);
(Continued)

(58) Field of Classification Search
CPC . A47B 47/0075; A47B 47/042; A47B 47/047; A47B 2230/0081;
(Continued)

(56) References Cited

U.S. PATENT DOCUMENTS

| 291,032 A | 1/1884 | Cleland |
| 634,581 A | 10/1899 | Miller |
| (Continued) |

FOREIGN PATENT DOCUMENTS

| CH | 685 276 A5 | 5/1995 |
| CH | 696 889 A5 | 1/2008 |
| (Continued) |

OTHER PUBLICATIONS

U.S. Appl. No. 15/642,757, Peter Derelöv, filed Jul. 6, 2017, (Cited herein as U.S. Pat. No. 2017/0298973 A1 of Oct. 19, 2017).
(Continued)

*Primary Examiner* — Jonathan P Masinick
(74) *Attorney, Agent, or Firm* — Buchanan Ingersoll & Rooney P.C.

(57) ABSTRACT

A set of panel-shaped elements includes a first panel-shaped element, a second panel-shaped element, and a third panel-shaped element. The first panel-shaped element includes at least one recess that extends through the first panel-shaped element from a first side to a second side. The second panel-shaped element includes a first profiled portion, which is configured to extend into the recess from the first side of the first panel-shaped element. The third panel-shaped element includes a second profiled portion, which is configured to extend into the recess from the second side of the first panel-shaped element and for locking engagement with the first profiled portion. The set of panel-shaped elements can be assembled using a method where the third element is moved into locking engagement with the first and second elements.

17 Claims, 6 Drawing Sheets

(51) Int. Cl.
  *A47B 3/06* (2006.01)
  *A47B 47/00* (2006.01)
  *F16B 12/12* (2006.01)
  *F16B 12/46* (2006.01)
  *A47B 47/04* (2006.01)

(52) U.S. Cl.
  CPC .......... *A47B 47/042* (2013.01); *A47B 88/941* (2017.01); *F16B 12/125* (2013.01); *F16B 12/46* (2013.01); *A47B 2230/0081* (2013.01); *F16B 2012/466* (2013.01)

(58) Field of Classification Search
  CPC ............. A47B 2230/0096; F16B 5/008; F16B 5/0012; F16B 12/125; F16B 12/46
  See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,765,465 A | 10/1973 | Gulistan |
| 3,784,271 A | 1/1974 | Schreiber |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,308,961 A | 1/1982 | Kunce |
| 4,324,517 A | 4/1982 | Dey |
| 4,403,886 A | 9/1983 | Haeusler |
| 4,509,648 A | 4/1985 | Govang |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,360,121 A | 11/1994 | Sothman |
| 5,375,802 A | 12/1994 | Branham, II |
| 5,423,155 A | 6/1995 | Bauer |
| 5,475,960 A | 12/1995 | Lindal |
| 5,499,886 A | 3/1996 | Short et al. |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,893,617 A | 4/1999 | Lee |
| 5,944,294 A | 8/1999 | Baer |
| 5,950,389 A | 9/1999 | Porter |
| 6,050,426 A | 4/2000 | Leurdijk |
| 6,142,436 A | 11/2000 | Thurston et al. |
| 6,312,186 B1 | 11/2001 | Röck et al. |
| 6,363,645 B1 | 4/2002 | Hunter |
| 6,413,007 B1 | 7/2002 | Lambright |
| 6,491,172 B2 | 12/2002 | Chance |
| 6,505,452 B1 | 1/2003 | Hannig |
| 6,547,086 B1 | 4/2003 | Harvey |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 * | 10/2006 | Pervan ...................... E04C 2/20 52/592.1 |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,365,499 B2 | 2/2013 | Nilsson et al. |
| 8,387,327 B2 | 3/2013 | Pervan |
| 8,495,849 B2 | 7/2013 | Pervan |
| 8,505,257 B2 | 8/2013 | Boo et al. |
| 8,544,230 B2 | 10/2013 | Pervan |
| 8,602,227 B1 | 12/2013 | McDonald |
| 8,615,952 B2 | 12/2013 | Engström |
| 8,745,952 B2 | 6/2014 | Perra |
| 8,764,137 B2 | 7/2014 | Fehre |
| 8,833,028 B2 | 9/2014 | Whispell et al. |
| 8,864,407 B1 * | 10/2014 | Sorum ...................... F16B 5/008 403/381 |
| 8,887,468 B2 | 11/2014 | Håkansson et al. |
| 9,175,703 B2 | 11/2015 | Maertens |
| 9,216,541 B2 * | 12/2015 | Boo ...................... B29C 66/41 |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |

(56) References Cited

U.S. PATENT DOCUMENTS

| | | |
|---|---|---|
| 2002/0170258 A1 | 11/2002 | Schwitte et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0173122 A1 | 7/2010 | Susnjara |
| 2010/0289389 A1 | 11/2010 | Crabtree, II |
| 2011/0225921 A1 | 9/2011 | Schulte |
| 2011/0225922 A1 | 9/2011 | Pervan et al. |
| 2011/0280655 A1 | 11/2011 | Maertens |
| 2011/0283650 A1 | 11/2011 | Pervan et al. |
| 2012/0009383 A1 | 1/2012 | Hardesty |
| 2012/0027967 A1 | 2/2012 | Maertens |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0328396 A1 | 11/2018 | Fransson et al. |
| 2019/0113061 A1 | 4/2019 | Håkansson et al. |

FOREIGN PATENT DOCUMENTS

| | | |
|---|---|---|
| CH | 698 988 B1 | 12/2009 |
| CN | 101099618 A | 1/2008 |
| CN | 203424576 U | 2/2014 |
| DE | 26 35 237 A | 2/1978 |
| DE | 31 03 281 A1 | 8/1982 |
| DE | 20 2008 011 589 U1 | 11/2008 |
| DE | 20 2009 008 825 U1 | 10/2009 |
| DE | 10 2009 041 142 A1 | 3/2011 |
| DE | 10 2014 110 124 A1 | 1/2016 |
| EP | 0 060 203 A2 | 9/1982 |
| EP | 0 362 968 A | 4/1990 |
| EP | 0 675 331 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 863 984 A1 | 12/2007 |
| EP | 1 992 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 482 213 A | 1/2012 |
| GB | 2 520 927 A | 6/2015 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 99/22150 A1 | 5/1999 |
| WO | WO 00/66856 A1 | 11/2000 |
| WO | WO 01/02669 A1 | 1/2001 |
| WO | WO 01/02670 A1 | 1/2001 |
| WO | WO 03/016654 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |

(56) References Cited

FOREIGN PATENT DOCUMENTS

| WO | WO 2011/151737 A3 | 12/2011 |
|----|----|----|
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 20151105451 A1 | 7/2015 |
| WO | WO 2017/131574 A1 | 8/2017 |
| WO | WO 2017/135874 | 8/2017 |
| WO | WO 2018/080387 A1 | 5/2018 |

OTHER PUBLICATIONS

U.S. Appl. No. 15/584,633, Chrisitan Boo, filed May 2, 2017, (Cited herein as U.S. Pat. No. 2017/00360193 A1 of Dec. 21, 2017).
U.S. Appl. No. 15/646,714, Peter Derelöv, filed Jul. 11, 2017.
U.S. Appl. No. 15/562,254, Peter Derelöv, filed Sep. 27, 2017.
U.S. Appl. No. 15/567,507, Christian Boo, Peter Derelöv and Agne Pålsson, filed Oct. 18, 2017.
U.S. Appl. No. 15/794,491, Peter Derelöv, filed Oct. 26, 2017.
U.S. Appl. No. 15/848,164, Jonas Fransson, Andreas Blomgren and Karl Erikson, filed Dec. 20, 2017.
U.S. Appl. No. 15/923,701, Peter Derelöv, filed Mar. 16, 2018.
U.S. Appl. No. 15/646,714, Derelöv et al.
U.S. Appl. No. 15/562,254, Derelöv.
U.S. Appl. No. 15/567,507, Boo et al.
U.S. Appl. No. 15/794,491, Derelöv.
U.S. Appl. No. 15/848,164, Fransson, et al.
U.S. Appl. No. 15/923,701, Derelöv.
International Search Report/Written Opinion dated Mar. 30, 2017 in PCT/SE2017/050125, ISA/SE, Patent-och registreringsverket, Stockholm, SE, 11 pages.
Derelöv, Peter, et al., U.S. Appl. No. 15/646,714 entitled "Assembled Product and a Method of Assembling the Product", filed in the U.S. Patent and Trademark Office filed Jul. 11, 2017.
Derelöv, Peter, U.S. Appl. No. 15/562,254 entitled "Panel with a Slider", filed in the U.S. Patent and Trademark Office filed Sep. 27, 2017.
Boo, Christian, et al., U.S. Appl. No. 15/567,507 entitled "Panel With a Fastening Device," filed in the U.S. Patent and Trademark Office filed Oct. 18, 2017.
Derelöv, Peter, U.S. Appl. No. 15/794,491 entitled "Set of Panels with a Mechanical Locking Device", filed in the U.S. Patent and Trademark Office filed Oct. 26, 2017.
Fransson, Jonas, et al., U.S. Appl. No. 15/848,164 entitled "Device for Inserting a Tongue", filed in the U.S. Patent and Trademark Office filed Dec. 20, 2017.
Derelöv, Peter, U.S. Appl. No. 15/923,701 entitled "Panels Comprising a Mechanical Locking Device and an Assembled Product Comprising the Panels", filed in the U.S. Patent and Trademark Office filed Mar. 16, 2018.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/027,479, Christian Boo and Peter Derelöv, filed Jul. 5, 2018.
U.S. Appl. No. 15/956,949, Derelöv.
U.S. Appl. No. 15/978,630, Fransson, et al.
U.S. Appl. No. 16/027,479, Boo et al.
Derelöv, Peter, U.S. Appl. No. 15/956,949 entitled "Panels for an Assembled Product", filed in the U.S. Patent and Trademark Office filed Apr. 19, 2018.
Fransson, Jonas, et al., U.S. Appl. No. 15/978,630 entitled "Elements and a Locking Device for an Assembled Product," filed in the U.S. Patent and Trademark Office filed May 14, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office filed Jul. 5, 2018.
U.S. Appl. No. 14/158,165, Peter Derelöv, filed Jan. 17, 2014.
U.S. Appl. No. 14/486,681, Hans Brännström, filed Sep. 15, 2014, (Cited herein as U.S. Pat. No. 2015/0078807 A1 of Mar. 19, 2015).
U.S. Appl. No. 14/573,473, Peter Derelöv, filed Dec. 17, 2014, (Cited herein as U.S. Pat. No. 2015/0196118 A1 of Jul. 16, 2015).
U.S. Appl. No. 14/573,572, Christian Boo, filed Dec. 17, 2014, (Cited herein as U.S. Pat. No. 2015/0198191 A1 of Jul. 16, 2015).
U.S. Appl. No. 14/972,949, Christian Boo, filed Dec. 17, 2015, (Cited herein as U.S. Pat. No. 2016/0174704 A1 of Jun. 23, 2016).
U.S. Appl. No. 15/171,403, Peter Derelöv, filed Jun. 2, 2016 (Cited herein as U.S. Pat. No. 2016/0270531 A1 of Sep. 22, 2016).
U.S. Appl. No. 15/271,622, Peter Derelöv, filed Sep. 21, 2016 (Cited herein as U.S. Pat. No. 2017/0079433 A1 of Mar. 23, 2017).
U.S. Appl. No. 15/308,872, Darko Pervan, filed Nov. 4, 2016 (Cited herein as U.S. Pat. No. 2017/0089379 A1 of Mar. 30, 2017).
U.S. Appl. No. 15/379,791, Niclas Håkansson, filed Dec. 15, 2016 (Cited herein as U.S. Pat. No. 2017/0097033 A1 of Apr. 6, 2017).
U.S. Appl. No. 15/366,704, Peter Derelöv, filed Dec. 1, 2016.
U.S. Appl. No. 15/415,356, Peter Derelöv, filed Jan. 25, 2017.
U.S. Appl. No. 15/422,798, Magnus Fridlund, filed Feb. 2, 2017.
U.S. Appl. No. 15/428,469, Magnus Fridlund, filed Feb. 9, 2017.
U.S. Appl. No. 15/432,190, Magnus Fridlund, filed Feb. 14, 2017.
U.S. Appl. No. 15/366,704, Derelöv.
U.S. Appl. No. 15/415,356, Derelöv, et al.
U.S. Appl. No. 15/422,798, Fridlund.
U.S. Appl. No. 15/428,469, Fridlund.
U.S. Appl. No. 15/432,190, Fridlund.
Derelöv, Peter, U.S. Appl. No. 15/366,704 entitled "Panels Comprising a Mechanical Locking Device and an Assembled Product Comprising the Panels", filed in the U.S. Patent and Trademark Office filed Dec. 1, 2016.
Derelöv, Peter, et al., U.S. Appl. No. 15/415,356 entitled "Panels Comprising a Mechanical Locking Device and an Assembled Product Comprising the Panels", filed in the U.S. Patent and Trademark Office filed Jan. 25, 2017.
Fridlund, Magnus, U.S. Appl. No. 15/422,798 entitled "Set of Panels for an Assembled Product," filed in the U.S. Patent and Trademark Office filed Feb. 2, 2017.
Fridlund, Magnus, U.S. Appl. No. 15/428,469 entitled "Element and Method for Providing Dismantling Groove," filed in the U.S. Patent and Trademark Office filed Feb. 9, 2017.
Fridlund, Magnus, U.S. Appl. No. 15/432,190 entitled "Method for Forming a Panel," filed in the U.S. Patent and Trademark Office filed Feb. 14, 2017.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/228,975, Niclas Håkansson and Darko Pervan, filed Dec. 21, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/220,574, Derelöv.
U.S. Appl. No. 16/220,585, Derelöv.
U.S. Appl. No. 16/228,975, Håkansson et al.
U.S. Appl. No. 16/361,609, Derelöv.
U.S. Appl. No. 16/386,732, Boo.
U.S. Appl. No. 16/386,810, Boo.
U.S. Appl. No. 16/386,824, Boo.

(56) References Cited

OTHER PUBLICATIONS

U.S. Appl. No. 16/386,874, Derelöv.
Derelöv, Peter, U.S. Appl. No. 16/220,574 entitled "Set of Panels," filed in the U.S. Patent and Trademark Office filed Dec. 14, 2018.
Derelöv, Peter, U.S. Appl. No. 16/220,585 entitled "Set of Panels," filed in the U.S. Patent and Trademark Office filed Dec. 14, 2018.
Håkansson, Niclas, et al., U.S. Appl. No. 16/228,975 entitled "Mechanical Locking System for Building Panels," filed in the U.S. Patent and Trademark Office filed Dec. 21, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office filed Mar. 22, 2019.
Boo, Christian, U.S. Appl. No. 16/386,732 entitled "Set of Panels With a Mechanical Locking Device," filed in the U.S. Patent and Trademark Office filed Apr. 17, 2019.
Boo, Christian, U.S. Appl. No. 16/386,810 entitled "Set of Panels With a Mechanical Locking Device," filed in the U.S. Patent and Trademark Office filed Apr. 17, 2019.
Boo, Christian, U.S. Appl. No. 16/386,824 entitled "Set of Panels With a Mechanical Locking Device," filed in the U.S. Patent and Trademark Office filed Apr. 17, 2019.
Derelöv, Peter, U.S. Appl. No. 16/386,874 entitled "Symmetric Tongue and T-Cross," filed in the U.S. Patent and Trademark Office filed Apr. 17, 2019.
Extended European Search Report issued in EP Application No. 17750524.5, dated Jun. 21, 2019, European Patent Office, Munich, DE, 8 pages.

\* cited by examiner

SET OF PANEL-SHAPED ELEMENTS FOR A COMPOSED ELEMENT

CROSS REFERENCE TO RELATED APPLICATIONS

The present application claims the benefit of Swedish Application No. 1650158-7, filed on Feb. 9, 2016. The entire contents of Swedish Application No. 1650158-7 are hereby incorporated herein by reference in their entirety.

FIELD OF THE INVENTION

Embodiments of the present invention relate to a set of panel-shaped elements that can be assembled to a composed element. More particularly, the set of panel-shaped elements comprises a first panel-shaped element, a second panel-shaped element, and a third panel-shaped element. The second panel-shaped element and the third panel-shaped element comprise locking members that can be engaged in locking engagement within a recess of the first panel-shaped element such that all three panel-shaped elements may be locked together. According to an embodiment of a method of the invention, the set of panel-shaped elements can be assembled by moving the third panel-shaped element into locking engagement with second panel-shaped element, which may lock them to the first element.

BACKGROUND OF THE INVENTION

A conventional furniture product, such as a shelf, a drawer, a cabinet, or a table may be composed of a plurality of vertical and horizontal elements or panels. The panels may be assembled with a mechanical locking system, such as disclosed in, for example, WO 2010/070472. The mechanical locking system comprises a flexible member in a first panel that fits into a profiled part of a second panel.

In some situations, it may be desired that the product comprises an element that forms an intermediate wall with elements extending substantially perpendicularly on each side of the wall, such as is illustrated in FIGS. 62 to 65 of WO2010/070472. Here, one and more connecting pieces provide for a coupling with each time an intermediate wall. Hence, the connecting piece with three separate grooves is required to receive the three profiled parts of the three elements. The elements can be used as supports for shelves, which are mounted in a conventional manner. The additional connecting piece adds cost to the product, and may make the product instable since a further member is introduced into the product. It also adds time for manufacturing the elements for the composed elements.

It is desired that an assembled product is stable and rigid. In some situations, it may be desired to assemble the product easily, and even disassemble or dismantle the product after it has been assembled, such as for fairs and other events, so it can be reused. Yet, the product should be stable, easy to assemble and dismantle, and time and cost efficient to produce.

Embodiments of the present invention addresses a widely recognized need to for a composed product made of panel-shaped elements that may be rigid, easy to assemble and/or dismantle, and/or efficient to produce, and thus saves time and reduces cost.

SUMMARY OF THE INVENTION

Accordingly, embodiments of the present invention preferably seek to mitigate, alleviate or eliminate one or more deficiencies, disadvantages or issues in the art, such as the above-identified singly or in any combination, by providing a set of panel-shaped elements for a composed element, and a method for assembling such a set of panel-shaped elements to a composed element.

Embodiments may comprise a set of panel-shaped elements for assembly to a composed element. The set may comprise a first panel-shaped element, a second panel-shaped element, and a third panel-shaped element. The first panel-shaped element comprises a first side and an opposite second side extending in a longitudinal direction of the first panel-shaped element, and at least one recess at least partially extending through the first panel-shaped element from the first side to the second side. The second panel-shaped element comprises a first profiled portion at one of its ends. The first profiled portion is configured to extend into the recess from the first side of the first panel-shaped element. The third panel-shaped element comprises a second profiled portion at one of its ends. The second profiled portion is configured to extend into the recess from the second side of the first panel-shaped element and for locking engagement with the first profiled portion.

Each of the first profiled portion and the second profiled portion may form a tongue with a locking member sized and configured for mating engagement with the other of the first and the second profiled portion. Each locking member may have a non-flat shape in a longitudinal direction of the second panel-shaped element and the third panel-shaped element, respectively. The locking member of the second panel-shaped element and the locking member of the third panel-shaped element may have complementary non-flat shapes and face in opposite directions when received in the recess.

A lower surface of second profiled portion may be angled at a non-zero angle relative a longitudinal direction of the third panel-shaped element for angled engagement of the second profiled portion with the first profiled portion when the set of panel-shaped elements are assembled.

The first profiled portion may comprise a tip portion, and a base portion, which is located closer to the centre of the second panel-shaped element, in the longitudinal direction of the second panel-shaped element, than the tip portion of the first profiled portion. The second profiled portion may comprise a tip portion, and a base portion, which is located closer to the centre of the third panel-shaped element, in the longitudinal direction of the third panel-shaped element, than the tip portion of the second profiled portion. The tip portion of the second profiled portion may be configured to abut the base portion of the first profiled portion when the set of panel-shaped elements are assembled.

The tip portion of the first profiled portion may comprise an end surface facing in the longitudinal direction of the second panel. The third panel may comprise an end surface at the base of the second profiled portion. The end surface of the tip portion of the first profiled portion may be configured to abut the end surface of the third panel at the base of the second profiled portion.

In a first position for assembling the set of panel-shaped elements, a top end of the end surface of the tip portion of the first profiled portion may abut the end surface of the third panel at the base portion of the second profiled portion. The base portion of the first profiled portion may be separated from the tip portion of the second profiled portion. The third panel may be configured for angled motion from the first position to a second position, wherein the end surface of the tip portion of the first profiled portion abuts the end surface of the third panel at the base of the second profiled portion, and the base portion of the first profiled portion abuts the tip portion of the second profiled portion.

A first surface between the tip portion and the base portion of the first profiled portion may be configured to engage or abut a second surface between the tip portion and the base portion of the second profiled portion when the third panel-shaped element is angled from the first position to the second position.

A total width of the first profiled portion and the second profiled portion transverse to the longitudinal direction of the second panel-shaped element and the third panel-shaped element, respectively, may substantially correspond to a width of the recess in the longitudinal direction of the first panel-shaped element.

The first profiled portion may have at least one portion configured to extend into at least one support recess of the first panel-shaped element and may have a width substantially corresponding to the width of the support recess.

The support recess may extend only partially through the first panel-shaped element. Additionally, the support recess may be located on at least one transverse side of said recess extending through the first panel-shaped element.

Embodiments may comprise a method for assembling a set of panel-shaped elements. The method may comprise providing a first panel-shaped element having a first side and an opposite second side extending in a longitudinal direction of the first panel-shaped element, and at least one recess at least partially extending through the first panel-shaped element from the first side to the second side; inserting a first profiled portion at one end of a second panel-shaped element into the recess from the first side of the first panel-shaped element such that the first profiled portion extends into the recess; inserting a second profiled portion at one end of a third panel-shaped element into the recess from the second side of the first panel-shaped element such that the second profiled portion extends into the recess; and moving the second profiled portion into locking engagement with the first profiled portion.

The second profiled portion may be moved into locking engagement with the first profiled portion by angling motion of the third panel while an end surface of a tip portion of the first profiled portion abuts an end surface of the third panel-shaped element.

The second profiled portion may be moved until a tip portion of the second profiled portion abuts a base portion of the first profiled portion.

The first profiled portion may be displaced in a direction substantially perpendicular to the first panel-shaped element and towards the third panel-shaped element. The third panel-shaped element may be displaced in a direction substantially perpendicular to the first panel-shaped element and towards the second panel-shaped element while the third panel-shaped element is angled from an unlocked position into said locking engagement with the first profiled portion.

Inserting the first profiled portion into the recess may comprise inserting into said recess a portion of the first profiled portion having a width substantially corresponding to a width of the recess.

Some embodiments provide for a set of panel-shaped elements that are efficient to assemble to a composed element. Since the number of individual components required to obtain the composed elements are reduced, the panel-shaped elements is easy to assemble and dismantle, which saves time and cost. Furthermore, locking the panel-shaped elements without any separate components adds to the stability of the composed element. It can also be produced with a relatively tight fit, which improves the stability.

The term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DESCRIPTION OF EMBODIMENTS

Figure 1:
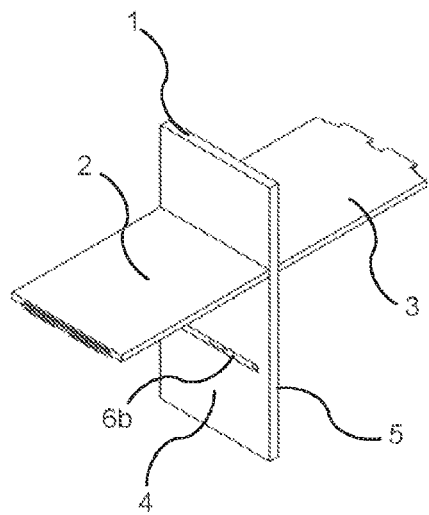
FIG. 1 is a perspective view of the set of panel-shaped elements in an assembled state.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present description of the current invention is given with reference to vertical and horizontal panel-shaped elements for a shelf as an example where the horizontal panel-shaped elements are arranged perpendicularly relative a vertical panel-shaped element. It should be born in mind, however, that the present invention is not limited strictly to a shelf, but can be easily adapted to other types of composed elements, wherein two panel-shaped elements can be arranged non-perpendicularly on each side of another panel-shaped element, to compose such elements as boxes, drawers, cabinets, tables, etc., or sections thereof.

FIG. 1 illustrates a set of panel-shaped elements including a first panel shaped element 1, a second panel shaped element 2, and a third panel-shaped element 3, which will be denoted first panel, second panel, and third panel, respectively, in the following. The first panel 1 may form a vertical element, such as a vertical wall or support of a shelf, for example an intermediate wall of a shelf or cabinet. The second and third panels 2, 3 may form horizontal elements, such as shelves arranged on each side of the first panel 1. In the following, reference will be made to a first panel 1 as a vertical panel of the set of panel-shaped elements. However, the set of panel-shaped elements may comprise any number of panels corresponding to the first panel 1, i.e., configured to support the second panel 2 and the third panel 3, as will be discussed below. Similarly, reference will be made to the second panel 2 and the third panel 3 in the following as horizontal panels of the set of panel-shaped elements. However, the set of panel-shaped elements may comprise any number of panels corresponding to the second panel 2 and the third panel 3. In FIG. 1, the panels 1-3 are assembled to a composed element.

Figure 2:
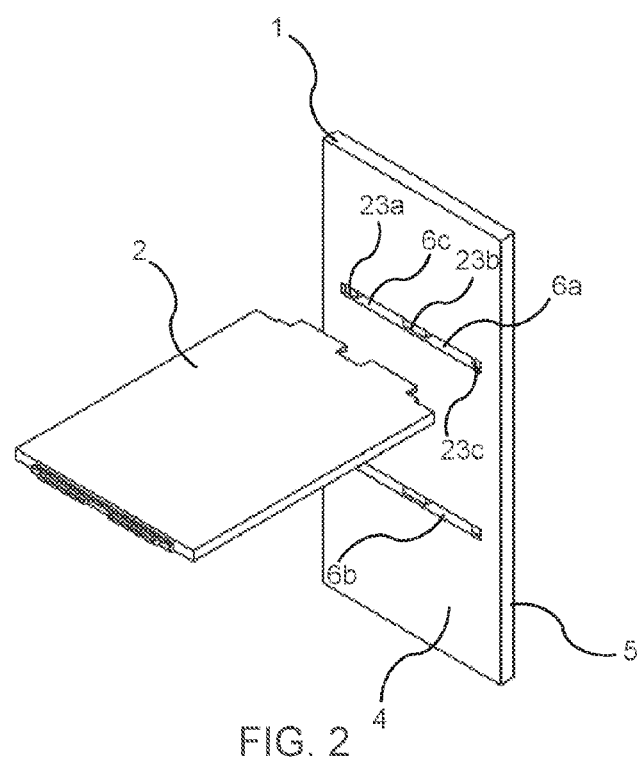
FIG. 2 is a perspective view of two of the set of panel-shaped elements in a disassembled state.

FIG. 2 illustrates the first panel 1 and the second panel 2 in a disassembled state. Generally, the second panel 2 and the third panel 3 each comprises at least one member of a locking mechanism that may fit into the first panel 1 with a transition fit when the locking member of the other panel 2,3 is not present. However, when the three panels 1-3 are assembled, the locking members of the second and third panels 2,3 may be brought from an initial transition fit relative the first panel 1 to an interference or press fit when the locking members of the second and third panels 2,3 are fully engaged in the first panel 1, as is illustrated in FIG. 1 and will be further described below with regard to FIGS. 7a-7b.

As can be seen in FIGS. 1-2, the first panel 1 comprises a first side 4 and a second side 5 opposite the first side 4. The first side 4 and the second side 5 may be parallel, and extend in a longitudinal direction of the first panel 1. At least one recess 6a, 6b at least partially extends through the first panel 1 from the first side 4 to the second side 5. "At least partially extends through" meaning that at least a portion of the recess 6a, 6b extends all the way through the first panel 1 from the first side 4 to the second side 5. One or several portions may only extend partially through the first panel 1, also from each of the first side 4 and the second side 5 such that at least one wall is formed in the recesses from each of the first side 4 and the second side 5. Such a wall may be provided between and on the transverse side(s) of recesses that extends completely through the first panel 1. This provides for improved stability of the composed product and rigidity of the first panel 1.

Figure 3:
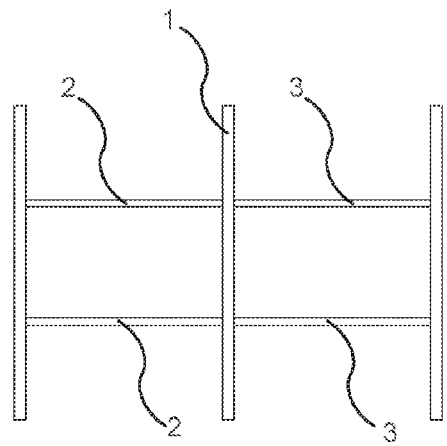
FIG. 3 is a perspective view of the set of panel-shaped elements mounted between two vertical side supports.

FIG. 3 illustrates the set of panels-shaped elements composed within a shelf, wherein the second panel 2 and the third panel 3 are connected to vertical end or side supports. The first panel 1 forms an intermediate support. The set of panels according to embodiments described herein can be extended with any number of vertical panels, such that the length or number of shelf units is extended as desired. Vertical and horizontal panels can simply be added to the set of panel shaped elements. Hence, embodiments of the invention are very flexible. A vertical side support may be connected to the second panel 2 or the third panel 3 using the locking system of WO2012/154113, such as described and illustrated in FIGS. 1a-1c, and which is incorporated herein by reference for all purposes. Additionally or alternatively, the locking system of the present invention may be used to connect the second panel 2 or the third panel 3 to the vertical side support. The vertical side support may comprise one or several recesses 6a-6c as described above. In order to lock the second or third panel 2, 3, a plug may comprise the first profiled portion 9 or the second profiled portion 10 at one end. The other end may lie flush with a side surface of the vertical side support when the plug is inserted into the recess 6a-6c. The plug may thus be a panel-shaped element within the meaning of the invention, albeit rather short, which substantially does not extend beyond the recess 6a-6b. Depending on whether the plug should lock the second panel 2 or the third panel 3, it is inserted before or after the profiled portion 8, 9 in the same way as described with regard to embodiments herein.

Figure 4A:
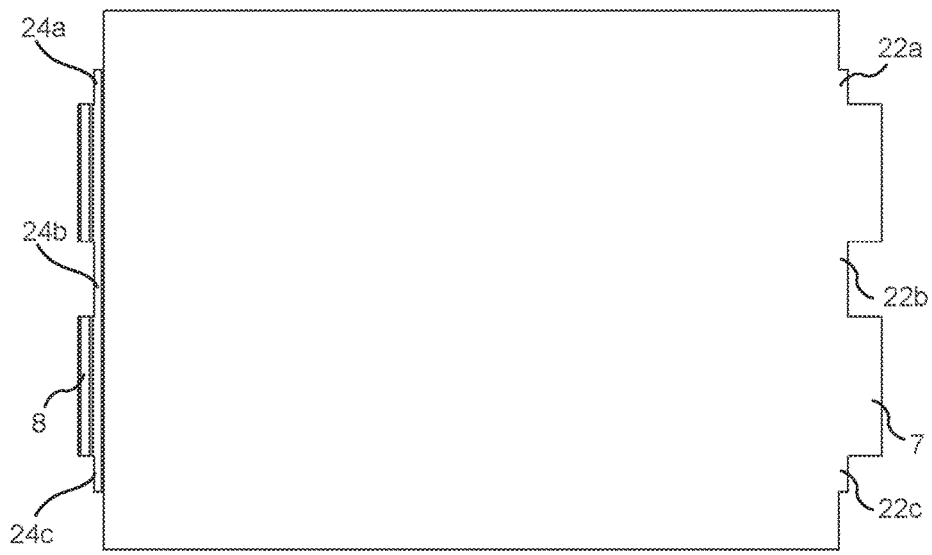
FIGS. 4a-4b is a top view and a side view, respectively, of a horizontal panel-shaped element.
Figure 4B:
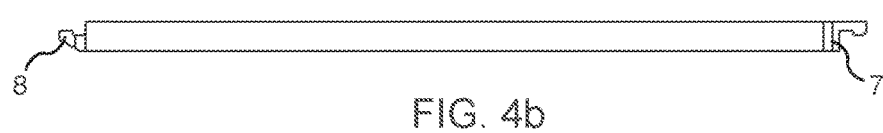

FIGS. 4a-4b illustrate a single panel with a first locking member 7 at one end of the panel and a second locking member 8 at another end of the panel. The first locking member 7 is designed for engagement with the second locking member 8 when arranged on another panel, and vice versa. Hence, a single panel may be used as either the second panel 2 or the third panel 3. In other embodiments, the second panel 2 only comprises the first locking member 7, and the third panel 3 only comprises the second locking member 8. Such panels may be used to lock to a vertical end support. In the following, reference will be made to the second panel 2 having the first locking member 7, and the third panel 3 having the second locking member 8. However, complementary locking members may be provided at the other end even if that is not described. Thus, the locking members 7,8 will be described below as forming part of separate panels, but may be provided at opposing ends of one and the same panel.

Figure 4C:
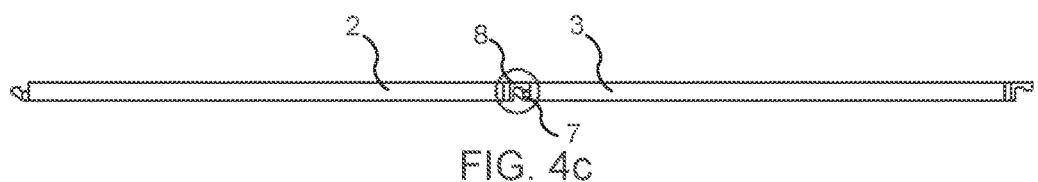
FIG. 4c is a side view of horizontal panel-shaped elements with their respective locking members in an engaged state.
Figure 4D:
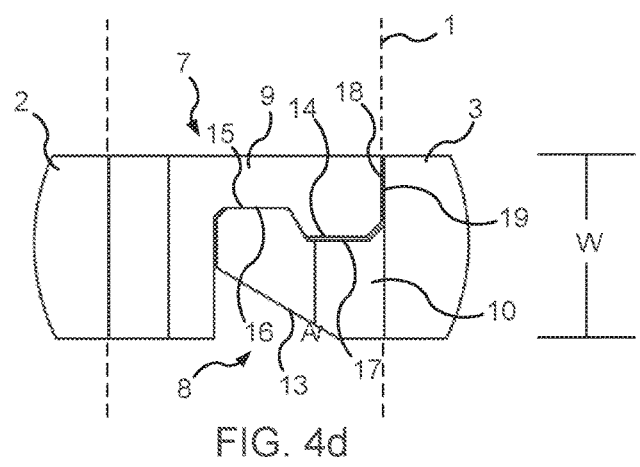
FIG. 4d is an enlarged side view of a section of FIG. 4c illustrating details of the locking members in the engaged state.

As can be seen in FIGS. 4c-4d, the first locking member 7 of the second panel 2 comprises a first profiled portion 9 at one of its ends. The first profiled portion 9 is configured to extend into the recess 6a-6b from the first side 4 of the first panel 1. The second locking member 8 of the third panel 3 comprises a second profiled portion 10 at one of its ends. The second profiled portion 10 is configured to extend into the recess 6a-6b from the second side 5 of the first panel 1. The second profiled portion 10 is configured for locking engagement with the first profiled portion 9, such as is illustrated in FIGS. 4c-4d. Hence, when the first profiled portion 9 and the second profiled portion 10 are arranged in the recess 6a-6b, a joint is formed such that the second panel 2 and the third panel 3 cannot be disconnected in the longitudinal axis of these panels 2,3.

The total width W of the first profiled portion 9 and the second profiled portion 10 transverse to the longitudinal direction of the second panel 2 and the third panel 3, respectively, may substantially correspond to a width of the recess 6a, 6b measured parallel with the longitudinal axis of the first panel 1. Hence, when the first profiled portion 9 is arranged in engagement with the second profiled portion 10, the second panel 2 and the third panel 3 may be locked in the recess 6a, 6b at least in a direction perpendicular to the longitudinal axes of the second panel 2 and the third panel 3.

FIG. 4d illustrates an embodiment wherein each of the first profiled portion 9 and the second profiled portion 10 forms a tongue. Each tongue may comprise the locking member 7, 8. The first profiled portion 9 and the second profiled portion 10 are sized and configured for mating engagement with the other of the first profiled portion 9 and the second profiled portion 10, such as illustrated in FIG. 4d. Each locking member 7, 8 has in this embodiment a non-flat shape in a longitudinal direction of the second panel 2 and the third panel 3, respectively. The locking member 9 of the second panel 2 and the locking member 10 of the third panel 3 have complementary non-flat shapes and face in opposite directions when received in the recess 6a, 6b. Hence, the locking members 9, 10 engage within the recess 6a, 6b in a locking engagement, at least in a longitudinal direction of the second panel 2 and the third panel 3. Also, the total width W of the locking members 9, 10 may substantially correspond to the width of the recess 6a, 6b, such as described above, wherein the locking members 9, 10 are locked also in a direction perpendicular to the longitudinal direction of the second panel 2 and the third panel 3.

In other embodiments, the locking members have other shapes, such as one being a protrusion and the other being a recess that fit a snap fit engagement.

In the embodiment of FIG. 4d, a lower surface 13 of second profiled portion 10 is angled at a non-zero angle A relative a longitudinal direction of the third panel-shaped element 3. For example, the angle A may be between about 20 and about 70 degrees, for example, between about 35 and about 55 degrees, for example about 45 degrees. This provides for angled engagement of the second profiled portion 10 with the first profiled portion 9 when the set of panel-shaped elements are assembled. Assembly of the panels using angled motion will be further described with regard to FIGS. 7a-7b.

The first profiled portion 9 comprises a tip portion 14, and a base portion 15, which is located closer to the centre of the second panel 2, in the longitudinal direction of the second panel 2, than the tip portion 14 of the first profiled portion 9. Said differently, the base portion 15 is located closer to the first side 4 of the first panel 1 than the tip portion 14 when assembled with the first panel 1. Similarly, the second profiled portion 10 comprises a tip portion 16, and a base portion 17, which is located closer to the centre of the third panel 3, in the longitudinal direction of the third panel 3, than the tip portion 16 of the second profiled portion 10. Said differently, the base portion 17 is located closer to the second side 5 of the first panel 1 than the tip portion 16 when assembled with the first panel 1. The tip portion 16 of the second profiled portion 10 is configured to abut the base portion 15 of the first profiled portion 9 when the set of panel-shaped elements are assembled.

The tip portion 14,16 of each profiled portion 9,10 may form a protrusion, and the base portion 15,17 may for a recess as seen in a cross-section taken parallel to the interface between the first profiled portion 9 and the second profiled portion 10. This provides a locking arrangement.

Furthermore, the base portion 15 of the first profiled portion 9 and the tip portion 16 of the second profiled portion 10 may be sized and configured to be slightly larger than the recess 6a, 6b in a direction perpendicular to the longitudinal axis of the second panel 2 and the third panel 3, respectively. This means that the tip portion 16 of the second profiled portion 10 will press against the base portion 15 of the first profiled portion 9 to form a press-fit locking arrangement on the recess 6a, 6b. Hence, a stable locking arrangement is provided for. Hence, the total width W that substantially corresponds to a width of the recess 6a, 6b, as mentioned above, includes embodiments where the total width W and the width of the recess are dimensioned to provide a press-fit while not damaging the first panel 1 by providing a too high pressure. The dimensioning is dependent on, e.g., relative dimensions, thickness of panels, materials of panels, etc.

The angled lower surface 13 may extend from an outer end of the tip portion 16 towards the base portion 17 of the second profiled portion 10. A section of the base portion 17 may face and be parallel with the recess 6a, 6b, which provides for supporting the section of the base portion 17 within the recess 6a, 6b, which still provides for angled motion of the third panel 3 for assembly of the set of panel-shaped elements. An entire surface of the first profiled portion 9 that faces the recess 6a, 6b may be substantially parallel or parallel with the recess 6a, 6b. This provides for an even pressure against an opposing surface of the recess 6a, 6b, such that a stable press-fit connection may be formed without the risk of damaging the first panel 1.

Figure 7A:
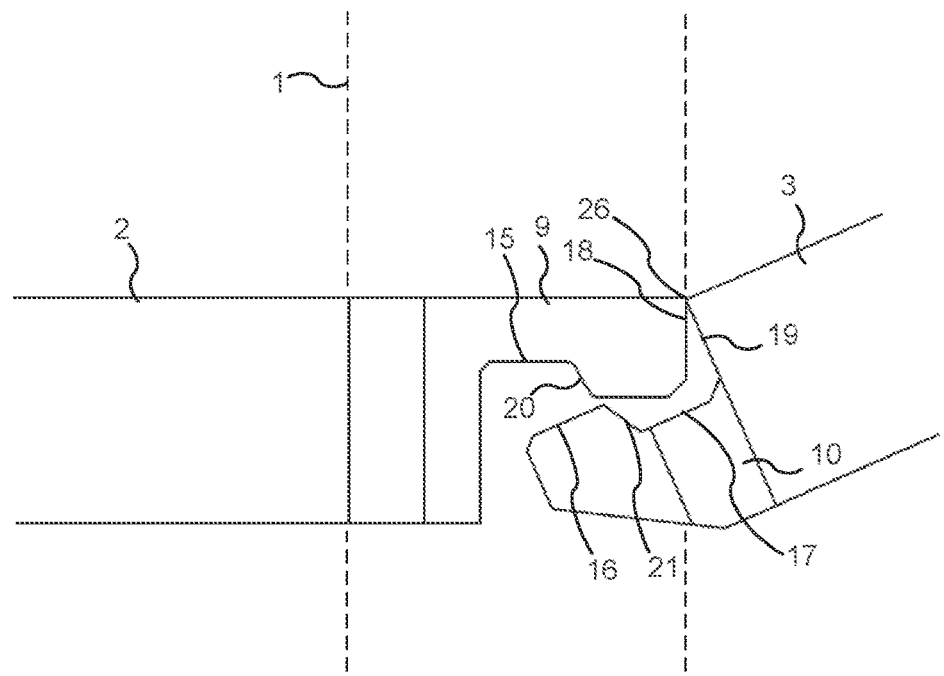
FIGS. 7a-7b are side views illustrating the engagement of the locking members of the respective horizontal panel-shaped elements during assembly from a disengaged position to an engaged position in the recess of a vertical panel-shaped element.
Figure 7B:
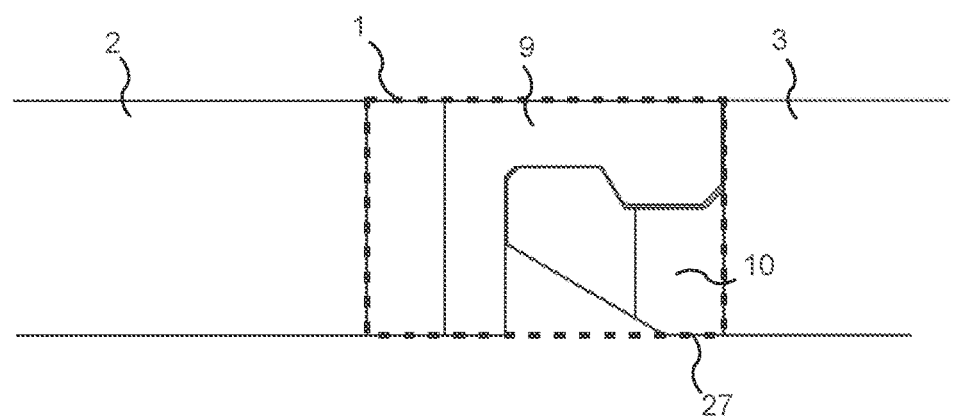

In some embodiments, such as illustrated in FIGS. 4d and 7a-7b, the tip portion 14 of the first profiled portion 9 comprises an end surface 18 facing in the longitudinal direction of the second panel 2. The third panel 3 comprises an end surface 19 at the base 17 of the second profiled portion 10. The end surface 18 of the tip portion 14 of the first profiled portion 9 is configured to abut the end surface 19 of the third panel 3 at the base 17 of the second profiled portion 10. As is illustrated in FIG. 7a, a first surface 20 between the tip portion 14 and the base portion 15 of the first profiled portion 9 may engage or abut a second surface 21 between the tip portion 16 and the base portion 17 of the second profiled portion 10 when the third panel 3 is angled from a first position, illustrated in FIG. 7a, to a second position, illustrated in FIG. 7b. Hence, the second panel 2 and the third panel 3 will have a relatively fixed relationship in the first position due to the abutment of the end surface 18 of the tip portion 14 of the first profiled portion 9 with the end surface 19 of the second panel 3. The surfaces 20, 21 between the respective base portions 15, 17 and tip portions 14, 16 are non-parallel with the longitudinal axes of the second panel 2 and the third panel 3. The engagement of the first surfaces 20 and the second surface 21 between the respective base portions 15, 17 and tip portions 14, 16 during angling of the third panel 3 to the second position will force the second panel 2 towards the third panel 3, and vice versa. Hence, a stable locking arrangement is provided for. The fit between of the panels will also be tight, since the panels may be forced towards each other.

Figure 5A:
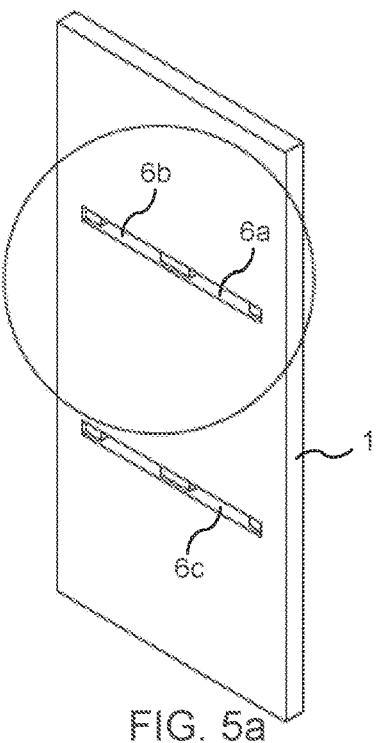
FIG. 5a is a perspective view of a vertical panel-shaped element with its recess for receiving the locking members.
Figure 5B:
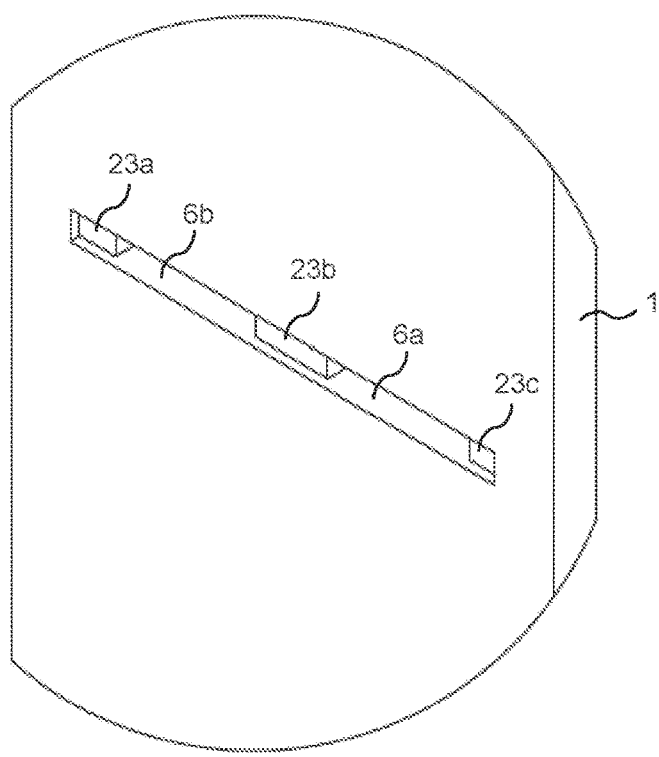
FIG. 5b is an enlarged perspective view of a section of FIG. 5a illustrating details of the recess for receiving the locking members and a support recess.

In some embodiments, such as illustrated in FIGS. 4a and 5a-b, the first profiled portion 9 has at least one portion 22a, 22b, 22c configured to extend into at least one support recess 23a, 23b, 23c of the first panel 1. The at least one portion 22a-22c of the first profiled portion 9 has a width substantially corresponding to the width of the support recess 23a-23c. The at least one portion 22a-22c and the support recess 23a, 23b, 23c may be sized and configured for an interference or press fit. Hence, the first profiled portion 9 may be supported within the recess 6a, 6b with a substantially fixed relationship within the recess 6a, 6b. This provide for a stable locking arrangement. It also makes it easier to assemble the panels 1-3, since the first panel 1 and second panel 2 can first be assembled, and then the third panel 3 is used to lock all three panels together to form a stable composed product.

As is illustrated in FIG. 5b, the support recess 23a-23c may extend only partially through the first panel 1. Also, it may be located on at least one transverse side of the recess 6a, 6b extending through the first panel 1. A support recess 23b located between a first recess 6a through the first panel 1 and another recess 6c through the first panel 1 for a single horizontal panel may form a wall between the first recess 6a and the other recess 6c. This provides for a stable locking arrangement. Separate tongues of the first profiled portion 9 of the single horizontal panel may fit into each of the first recess 6a and the other recess 6c, such as is illustrated in FIG. 2.

Figure 5C:
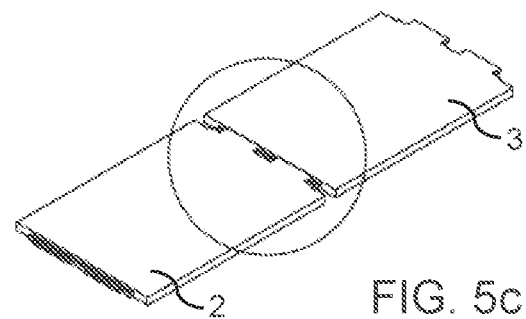
FIG. 5c is a perspective view of horizontal panel-shaped elements with their respective locking members in an engaged state.
Figure 5D:
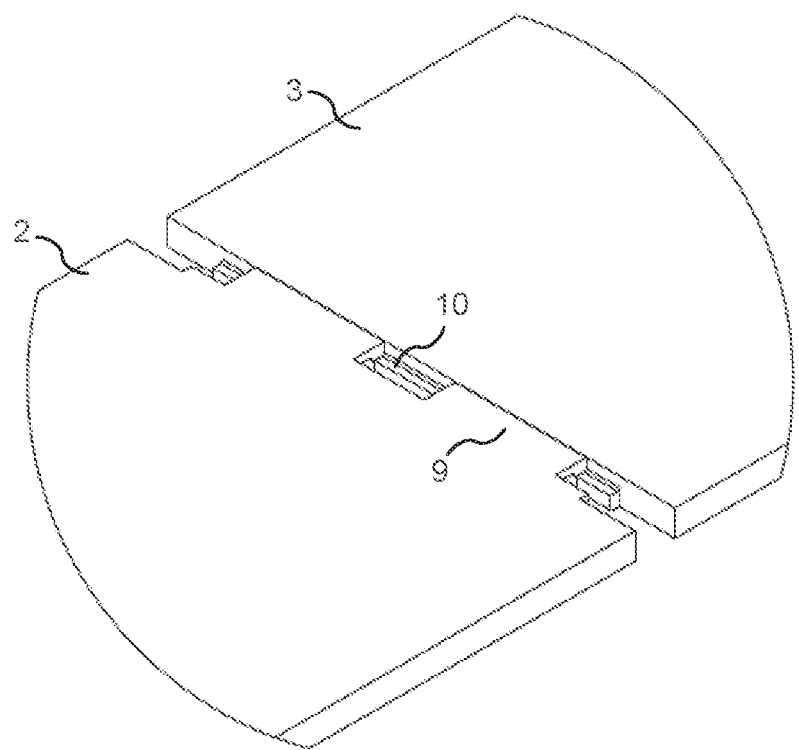
FIG. 5d is an enlarged perspective view of a section of FIG. 5c illustrating details of the horizontal panel-shaped elements with their respective locking members in the engaged state.

In FIGS. 5c-5d, the first profiled portion 9 is illustrated in locking engagement with the second profiled portion 10. At least one portion 24a, 24b, 24c, of the second profiled portion 10 may be configured to extend into a support recess extending from the second side 5 of the first panel, corresponding to support recess 23a-23c. However, the height of the support recess from the second side 5 may be lower than the height of the support recess from the first side 4. This provides for easy production of the base portion 17 of the second profiled portion 10, which can be provided in a single action together with the portion 24a-24c that extends into the support recess and to be used to form a stable locking arrangement. Hence, the shape of the base portion 17 and the shape of the support recess extending from the second side 5 of the first panel may be the same.

In the embodiments of FIGS. 1-4d, the profiled portions 9, 10 are illustrated with a first and a second tongue of the first and the second profiled portion 9, 10, respectively. Other embodiments comprise a single tongue, or more than two tongues, such as depending on the width of the panels 1-3, and/or the desired stability of a composed product.

Figure 6A:
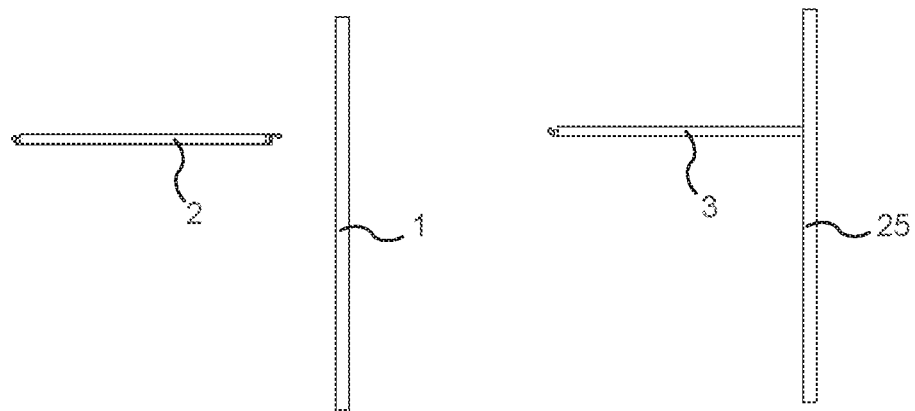
FIGS. 6a-6c are side views of the set of panel-shaped elements illustrating a method for assembling the panel-shaped elements to a composed element.
Figure 6B:
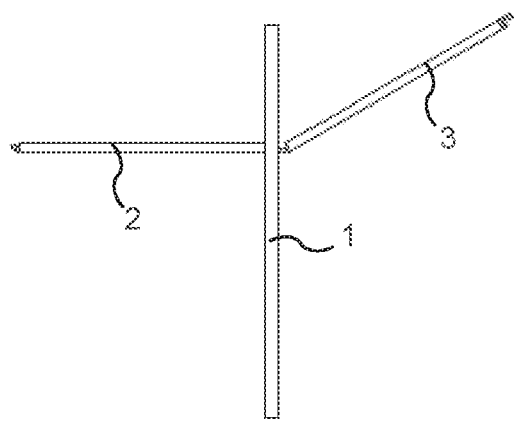
Figure 6C:
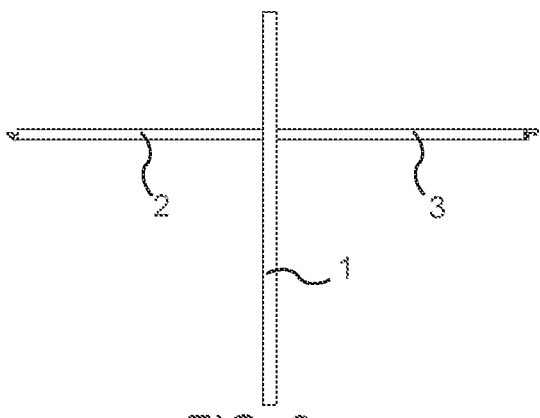

FIGS. 6a-6c, and 7a-7b illustrate a method for assembling a set of panel-shaped elements to a composed product (FIG. 6c). First, the first panel 1, the second panel 2, and the third panel 3, such as described in the above embodiments, are provided. In FIG. 6a, the third panel 3 is attached to a vertical support 25 before being assembled together with the first panel 1 and the second panel 2. In other embodiments, such as illustrated in FIG. 6b, the third panel 3 is not attached to any other panel before being assembled with the first panel 1 and the second panel 2.

As is illustrated in FIGS. 6a and 7a, the first profiled portion 9 at one end of the second panel 2 is inserted into the recess 6a, 6b from the first side 4 of the first panel 1 such that the first profiled portion 9 extends into the recess 6a, 6b. The position of the first profiled portion 9 relative the first panel 1 is illustrated in FIG. 7a. Then, the second profiled portion 10 at one end of the third panel 3 is inserted into the recess 6a, 6b from the second side 5 of the first panel 1 such that the second profiled portion 10 extends into the recess 6a, 6b, such as is illustrated in FIG. 7a. The second profiled portion 10 is then moved into locking engagement with the first profiled portion 9. This provides for a stable locking of the panels 1-3 into a composed product, such as illustrated in FIG. 6c. It is also simple to disassemble the panels 1-3 by reversing the movement.

In some embodiments, the second profiled portion 10, and the third panel 3, may be inserted at a tilted angle relative the first panel 1 and the second panel 2 compared to its final position where it engages the first profiled portion 9, such as is illustrated in FIGS. 6b and 7a. Hence, the third panel 3 is inserted into the recess 6a, 6b at a non-parallel angle relative the second panel 2. Also it may be inserted at a non-perpendicular angle relative the first panel 1, if the final position between the longitudinal axes of the first panel 1 and the third panel 3 is perpendicular.

As is illustrated in FIGS. 7a-7b, in the first, unlocked, position for assembling the set of panel-shaped elements a top end 26 of the end surface 18 of the tip portion 14 of the first profiled portion 9 abuts the end surface 19 of the third panel 3. It may abut at the base portion 17 of the second profiled portion 10, such as above the base portion. In the first position, the base portion 15 of the first profiled portion 9 is separated from the tip portion 16 of the second profiled portion 10. Thus, third panel 3 is in this embodiment configured for rotational or angled motion from the first position to the second, locked or engaged, position. The third panel 3 may be rotated around the top end 26.

In the second position, the end surface 18 of the tip portion 14 of the first profiled portion 9 abuts the end surface 19 of the third panel 3, such as is illustrated in FIG. 7b. The base portion 15 of the first profiled portion 9 abuts the tip portion 16 of the second profiled portion 10. The base portion 17 of the second profiled portion 10 abuts the recess 6, 6b at a surface 27 facing in the opposite direction to the interface between the first locking member 7 and the second locking member 8. The end surface 19 of the third panel 3 at the base portion 17 of the second profiled portion 10, may be located outside of the recess 6a, 6b, or be substantially aligned with the second side 5 of the first panel 1. Ultimately, the third panel 3 will tend to pivot around the surface 27 of the base 17 of the second profiled portion 10 as the tip portion 16 is angled towards the base portion 15 of the first profiled portion 9. Hence, the tip portion 16 of the second profiled portion 10 will press the base portion 15 of the first profiled portion 9 in the longitudinal direction of the first panel 1. Hence, a press-fit locking arrangement is provided. Also, a small gap may be provided between the tip portion 14 of the first profiled portion 9 and the base portion 17 of the second profiled portion 10.

Hence, the second profiled portion 10 may be moved into locking engagement with the first profiled portion 9 by angling motion of the third panel 3 while the end surface 18 of the tip portion 18 of the first profiled portion 9 abuts the end surface 19 of the third panel-shaped element 3. The second profiled portion 10 may be moved until its tip portion 16 abuts the base portion 15 of the first profiled portion 9. The first profiled portion 9 may be displaced in a direction substantially perpendicular to the first panel 1 and towards the third panel 3. Also, the third panel 3 may be displaced in a direction substantially perpendicular to the first panel land towards the second panel 2 while the third panel 3 is angled from an unlocked position, such as illustrated in FIG. 7a, into the engagement with the first profiled portion 9, such as illustrated in FIG. 7b. As described above, a portion of the first profiled portion 9 having a width substantially corresponding to a width of the recess 6a, 6b may be inserted into the recess. Hence, the angling motion of the third panel transforms an initial slip fit between the first panel 1 and the second panel 2 into a press fit between the first panel 1, the second panel 2, and the third panel 3.

Furthermore, the tip portion 14, 16 of each profiled portion 9, 10 may form a protrusion, and the base portion 15, 17 may form a recess as seen in a cross-section taken parallel to the interface between the first profiled portion 9 and the second profiled portion 10. Hence, the shape of the profiled portions 9, 10 prevents the second panel 2 and third panel 3 to be separated in their longitudinal direction. The same elements may at the same time be configured to form a press-fit with the first panel 1 within the recess 6a, 6b.

When the word "about" is used in this specification in connection with a numerical value, it is intended that the associated numerical value include a tolerance of ±10% around the stated numerical value.

It should also be appreciated that features disclosed in the foregoing description, and/or in the foregoing drawings and/or following claims both separately and in any combination thereof, be material for realizing the present invention in diverse forms thereof. When used in the following claims, the terms "comprise", "include", "have" and their conjugates mean, "including but not limited to".

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

Embodiments

1. A set of panel-shaped elements for assembly to a composed element, comprising
a first panel-shaped element, a second panel-shaped element, and a third panel-shaped element, wherein
the first panel-shaped element comprises a first side and an opposite second side extending in a longitudinal direction of the first panel-shaped element, and at least one recess at least partially extending through the first panel-shaped element from the first side to the second side;
the second panel-shaped element comprises a first profiled portion at one of its ends, the first profiled portion being configured to extend into the recess from the first side of the first panel-shaped element; and
the third panel-shaped element comprises a second profiled portion at one of its ends, the second profiled portion being configured to extend into the recess from the second side of the first panel-shaped element and for locking engagement with the first profiled portion.

2. The set of panel-shaped elements according to embodiment 1, wherein
each of the first profiled portion and the second profiled portion forms a tongue with a locking member sized and configured for mating engagement with the other of the first and the second profiled portion, wherein
each locking member has a non-flat shape in a longitudinal direction of the second panel-shaped element and the third panel-shaped element, respectively, and
the locking member of the second panel-shaped element and the locking member of the third panel-shaped element have complementary non-flat shapes and face in opposite directions when received in the recess.

3. The set of panel-shaped elements according to any of the previous embodiments, wherein a lower surface of second profiled portion is angled at a non-zero angle relative a longitudinal direction of the third panel-shaped element for angled engagement of the second profiled portion with the first profiled portion when the set of panel-shaped elements are assembled.

4. The set of panel-shaped elements according to any of the previous embodiments, wherein
the first profiled portion comprises a tip portion, and a base portion, which is located closer to the centre of the second panel-shaped element, in the longitudinal direction of the second panel-shaped element, than the tip portion of the first profiled portion,
the second profiled portion comprises a tip portion, and a base portion, which is located closer to the centre of the third panel-shaped element, in the longitudinal direction of the third panel-shaped element, than the tip portion of the second profiled portion; and the tip portion of the second profiled portion is configured to abut the base portion of the first profiled portion when the set of panel-shaped elements are assembled.

5. The set of panel-shaped elements according to embodiment 4, wherein the tip portion of the first profiled portion comprises an end surface facing in the longitudinal direction of the second panel, and the third panel comprises an end surface at the base of the second profiled portion, wherein the end surface of the tip portion of the first profiled portion is configured to abut the end surface of the third panel at the base of the second profiled portion.

6. The set of panel-shaped elements according to embodiment 5, wherein
in a first position for assembling the set of panel-shaped elements a top end of the end surface of the tip portion of the first profiled portion abuts the end surface of the third panel at the base portion of the second profiled portion, and the base portion of the first profiled portion is separated from the tip portion of the second profiled portion; and
the third panel is configured for angled motion from the first position to a second position, wherein the end surface of the tip portion of the first profiled portion abuts the end surface of the third panel at the base of the second profiled portion, and the base portion of the first profiled portion abuts the tip portion of the second profiled portion.

7. The set of panel-shaped elements according to embodiment 6, wherein a first surface between the tip portion and the base portion of the first profiled portion is configured to abut a second surface between the tip portion and the base portion of the second profiled portion when the third panel-shaped element is angled from the first position to the second position.

8. The set of panel-shaped elements according to any of the previous embodiments, wherein a total width of the first profiled portion and the second profiled portion transverse to the longitudinal direction of the second panel-shaped element and the third panel-shaped element, respectively, substantially corresponds to a width of the recess in the longitudinal direction of the first panel-shaped element.

9. The set of panel-shaped elements according to any of the previous embodiments, wherein the first profiled portion has at least one portion configured to extend into at least one support recess of the first panel-shaped element and having a width substantially corresponding to the width of the support recess.

10. The set of panel-shaped elements according to embodiment 9, wherein the support recess extends only partially through the first panel-shaped element, and is located on at least one transverse side of said recess extending through the first panel-shaped element.

11. A method for assembling a set of panel-shaped elements, comprising
providing a first panel-shaped element having a first side and an opposite second side extending in a longitudinal direction of the first panel-shaped element, and at least one recess at least partially extending through the first panel-shaped element from the first side to the second side;
inserting a first profiled portion at one end of a second panel-shaped element into the recess from the first side of the first panel-shaped element such that the first profiled portion extends into the recess;
inserting a second profiled portion at one end of a third panel-shaped element into the recess from the second side of the first panel-shaped element such that the second profiled portion extends into the recess; and
moving the second profiled portion into locking engagement with the first profiled portion.

12. The method according to embodiment 11, comprising moving the second profiled portion into locking engagement with the first profiled portion by angling motion of the third panel while an end surface of a tip portion of the first profiled portion abuts an end surface of the third panel-shaped element.

13. The method according to embodiment 12, comprising moving the second profiled portion until a tip portion of the second profiled portion abuts a base portion of the first profiled portion.

14. The method according to any of embodiments 11-13, comprising moving the third panel-shaped element by angled motion from an unlocked position into said locking engagement with the first profiled portion while a first surface of the first profiled portion abuts a second surface of the second profiled portion such that the first profiled portion is displaced in a direction substantially perpendicular to the first panel-shaped element and towards the third panel-shaped element, and such that the third panel-shaped element is displaced in a direction substantially perpendicular to the first panel-shaped element and towards the second panel-shaped element.

15. The method according to any of embodiments 11-14, wherein inserting the first profiled portion into the recess comprises inserting into said recess a portion of the first profiled portion having a width substantially corresponding to a width of the recess.

The invention claimed is:

1. A set of panel-shaped elements for assembly to a composed element, comprising
a first panel-shaped element, a second panel-shaped element, and a third panel-shaped element, wherein
the first panel-shaped element comprises a first side and an opposite second side extending in a longitudinal direction of the first panel-shaped element, and at least one recess at least partially extending through the first panel-shaped element from the first side to the second side;
the second panel-shaped element comprises a first profiled portion at one of its ends, the first profiled portion being configured to extend into the recess from the first side of the first panel-shaped element; and
the third panel-shaped element comprises a second profiled portion at one of its ends, the second profiled portion being configured to extend into the recess from the second side of the first panel-shaped element and for locking engagement with the first profiled portion, wherein each of the first profiled portion and the second profiled portion forms a tongue with a locking member, the locking members engage within the recess in a locking engagement, at least in a longitudinal direction of the second and the third panel.

2. The set of panel-shaped elements according to claim 1, wherein
each locking member is sized and configured for mating engagement with the other of the first and the second profiled portion, wherein
each locking member has a non-flat shape in a longitudinal direction of the second panel-shaped element and the third panel-shaped element, respectively, and
the locking member of the second panel-shaped element and the locking member of the third panel-shaped element have complementary non-flat shapes and face in opposite directions when received in the recess.

3. The set of panel-shaped elements according to claim 1, wherein a lower surface of second profiled portion is angled at a non-zero angle relative a longitudinal direction of the third panel-shaped element for angled engagement of the second profiled portion with the first profiled portion when the set of panel-shaped elements are assembled.

4. The set of panel-shaped elements according to claim 1, wherein
the first profiled portion comprises a tip portion, and a base portion, which is located closer to the centre of the second panel-shaped element, in the longitudinal direction of the second panel-shaped element, than the tip portion of the first profiled portion,
the second profiled portion comprises a tip portion, and a base portion, which is located closer to the centre of the third panel-shaped element, in the longitudinal direction of the third panel-shaped element, than the tip portion of the second profiled portion; and
the tip portion of the second profiled portion is configured to abut the base portion of the first profiled portion when the set of panel-shaped elements are assembled.

5. The set of panel-shaped elements according to claim 4, wherein the tip portion of the first profiled portion comprises an end surface facing in the longitudinal direction of the second panel, and the third panel comprises an end surface at the base of the second profiled portion, wherein the end surface of the tip portion of the first profiled portion is configured to abut the end surface of the third panel at the base of the second profiled portion.

6. The set of panel-shaped elements according to claim 5, wherein
in a first position for assembling the set of panel-shaped elements a top end of the end surface of the tip portion of the first profiled portion abuts the end surface of the third panel at the base portion of the second profiled portion, and the base portion of the first profiled portion is separated from the tip portion of the second profiled portion; and
the third panel is configured for angled motion from the first position to a second position, wherein the end surface of the tip portion of the first profiled portion abuts the end surface of the third panel at the base of the second profiled portion, and the base portion of the first profiled portion abuts the tip portion of the second profiled portion.

7. The set of panel-shaped elements according to claim 6, wherein a first surface between the tip portion and the base portion of the first profiled portion is configured to abut a second surface between the tip portion and the base portion of the second profiled portion when the third panel-shaped element is angled from the first position to the second position.

8. The set of panel-shaped elements according to claim 1, wherein a total width of the first profiled portion and the second profiled portion transverse to the longitudinal direction of the second panel-shaped element and the third panel-shaped element, respectively, substantially corresponds to a width of the recess in the longitudinal direction of the first panel-shaped element.

9. The set of panel-shaped elements according to claim 1, wherein the first profiled portion has at least one portion configured to extend into at least one support recess of the first panel-shaped element and having a width substantially corresponding to the width of the support recess.

10. The set of panel-shaped elements according to claim 9, wherein the support recess extends only partially through the first panel-shaped element, and is located on at least one transverse side of said recess extending through the first panel-shaped element.

11. The set of panel-shaped elements according to claim 1, wherein the first profiled portion comprises a tip portion, and a base portion which is located closer to a centre of the second panel-shaped element, in the longitudinal direction of the second panel-shaped element, than the tip portion of the first profiled portion, the base portion being substantially parallel to a main plane of the second panel-shaped element.

12. A method for assembling a set of panel-shaped elements, comprising
provided a first panel-shaped element having a first side and an opposite second side extending in a longitudinal direction of the first panel-shaped element, and at least one recess at least partially extending through the first panel-shaped element from the first side to the second side;
inserting a first profiled portion at one end of a second panel-shaped element into the recess from the first side of the first panel-shaped element such that the first profiled portion extends into the recess;
inserting a second profiled portion at one end of a third panel-shaped element into the recess from the second side of the first panel-shaped element such that the second profiled portion extends into the recess; and
moving the second profiled portion into locking engagement with the first profiled portion,
moving the second profiled portion into locking engagement with the first profiled portion within the recess to thereby lock the second and third panel-shaped element at least in the longitudinal direction of the second and third panel-shaped element.

13. The method according to claim 12, comprising moving the second profiled portion into locking engagement with the first profiled portion by angling motion of the third panel while an end surface of a tip portion of the first profiled portion abuts an end surface of the third panel-shaped element.

14. The method according to claim 13, comprising moving the second profiled portion until a tip portion of the second profiled portion abuts a base portion of the first profiled portion.

15. The method according to claim 12, comprising moving the third panel-shaped element by angled motion from an unlocked position into said locking engagement with the first profiled portion while a first surface of the first profiled portion abuts a second surface of the second profiled portion such that the first profiled portion is displaced in a direction substantially perpendicular to the first panel-shaped element and towards the third panel-shaped element, and such that the third panel-shaped element is displaced in a direction substantially perpendicular to the first panel-shaped element and towards the second panel-shaped element.

16. The method according to claim 12, wherein inserting the first profiled portion into the recess comprises inserting into said recess a portion of the first profiled portion having a width substantially corresponding to a width of the recess.

17. The method according to claim 12, wherein the first profiled portion comprises a tip portion, and a base portion which is located closer to a centre of the second panel-shaped element, in the longitudinal direction of the second panel-shaped element, than the tip portion of the first profiled portion, the base portion being substantially parallel to a main plane of the second panel-shaped element.

* * * * *